(12) United States Patent
Gibbs

(10) Patent No.: US 7,685,347 B2
(45) Date of Patent: Mar. 23, 2010

(54) INTERRUPT CONTROLLER FOR INVOKING SERVICE ROUTINES WITH ASSOCIATED PRIORITIES

(75) Inventor: Douglas Ronald Gibbs, Longmont, CO (US)

(73) Assignee: Xilinx, Inc., San Jose, CA (US)

(*) Notice: Subject to any disclaimer, the term of this patent is extended or adjusted under 35 U.S.C. 154(b) by 230 days.

(21) Appl. No.: 12/001,616

(22) Filed: Dec. 11, 2007

(65) Prior Publication Data

US 2009/0150892 A1 Jun. 11, 2009

(51) Int. Cl.
*G06F 13/26* (2006.01)
(52) U.S. Cl. .................. 710/264; 710/48; 711/158
(58) Field of Classification Search ............ 710/48, 710/51, 266, 264
See application file for complete search history.

(56) References Cited

U.S. PATENT DOCUMENTS

| | | | | |
|---|---|---|---|---|
| 5,590,380 | A * | 12/1996 | Yamada et al. | 710/48 |
| 5,696,976 | A | 12/1997 | Nizar et al. | |
| 5,892,956 | A | 4/1999 | Qureshi et al. | |
| 5,905,898 | A * | 5/1999 | Qureshi et al. | 710/266 |
| 6,021,458 | A * | 2/2000 | Jayakumar et al. | 710/266 |
| 6,081,867 | A * | 6/2000 | Cox | 710/264 |
| 6,618,780 | B1 * | 9/2003 | Popat | 710/264 |
| 7,120,718 | B2 * | 10/2006 | Pezzini | 710/265 |

FOREIGN PATENT DOCUMENTS

WO    WO 95/18416 A    7/1995

OTHER PUBLICATIONS

Samek, Miro et al.; "Build a Super Simple Tasker"; published Jul. 12, 2006 in *Embedded Systems Design*; downloaded from http://www.embedded.com/columns/technicalinsights/190302110 on Jun. 19, 2008; pp. 1-24.

* cited by examiner

*Primary Examiner*—Henry W. H. Tsai
*Assistant Examiner*—Elias Mamo
(74) *Attorney, Agent, or Firm*—LeRoy D. Maunu; Lois D. Cartier

(57) ABSTRACT

An interrupt controller efficiently manages execution of tasks by a multiprocessor computing system. The interrupt controller has inputs for receiving service requests for invoking service routines. The service routines have higher priorities than the tasks executed on the processors. Associated with each processor is a register for storing the priority of the task executing on the processor. A comparator coupled to the processors determines the processor executing the task having a lower priority among the priorities of the tasks executing on the processors. For each service request received, a distributor generates an interrupt request for invoking the service routine of the service request on the processor with the lower priority. The register with the lower priority is set to the higher priority of the service routine in response to the interrupt request. For each processor, the interrupt controller has an output for transmitting the interrupt request to the processor.

16 Claims, 2 Drawing Sheets

INTERRUPT CONTROLLER FOR INVOKING SERVICE ROUTINES WITH ASSOCIATED PRIORITIES

FIELD OF THE INVENTION

The present invention generally relates to priority interrupt controllers, and more particularly to priority interrupt controllers in multiprocessor systems.

BACKGROUND

Computing systems execute software programs for performing tasks. The operating system of a computing system includes a scheduler, and the computing system executes the tasks selected by the scheduler. When a task completes execution on the computer system, the scheduler selects another task for execution on the computing system. When a task requests a service from the operating system, the scheduler can select another task for execution, especially when the operating system cannot immediately provide the service. When multiple tasks are ready for execution, the scheduler can ensure that the computing system executes all of the tasks by periodically interrupting the current task and selecting another task awaiting execution.

In some instances the computing system may need to execute a particular task to respond properly to an asynchronous event that is external to the computing system. For example, a peripheral device may notify the computing system of the external event, and the scheduler can interrupt the execution of the current task and select a task that processes the external event. Thus, both internal and external events can cause the scheduler to switch the task executing on the computing system.

Efficient management of the tasks can improve the performance of the computing system, as can increasing the number of processors in the computing system. However, increasing the number of processors also complicates the efficient management of tasks, because the computing system must assign each task to a processor. The computing system could assign certain tasks to each processor, but a processor does not contribute to the performance of the computing system whenever the processor is idle, because none of its assigned tasks is ready for execution.

The present invention may address one or more of the above issues.

SUMMARY

Various embodiments of the invention provide an interrupt controller for a multiprocessor computing system. The interrupt controller has inputs for receiving service requests for invoking service routines. The service routines have higher priorities than the tasks executed on the processors. Associated with each processor is a register for storing the priority of the task executing on the processor. A comparator coupled to the registers determines the processor executing a task having a lower priority among the priorities of the tasks executing on the processors. For each service request received, a distributor generates an interrupt request for invoking the service routine of the service request on the processor with the lower priority. The register with the lower priority is set to the higher priority of the service routine in response to the interrupt request. For each processor, the interrupt controller has an output for transmitting the interrupt request to the processor.

One or more additional embodiments of the invention provide a method for interrupting processors that execute tasks with priorities. The priority of the task executing on each processor is stored in a register associated with the processor. From the priorities stored in the registers, the processor is determined that is executing the task with a lower priority among the priorities from the registers. A service request is received for invoking a service routine having a higher priority than the priorities of the tasks executing on the processors. In response to the service request, an interrupt request is generated for invoking the service routine of the service request on the processor with the lower priority. In response to the interrupt request, the register associated with the processor with the lower priority is set to the higher priority of the service routine. The interrupt request is output to the processor with the lower priority.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

The tasks executed in a multi-processor computing system are efficiently managed in various embodiments of the invention by assigning each task an execution priority. When the computing system should execute a service routine to respond to an external or internal event, the scheduler and hardware execute the service routine on the processor currently executing the lowest priority task. The scheduler includes both software and hardware components, as discussed below.

Figure 1:
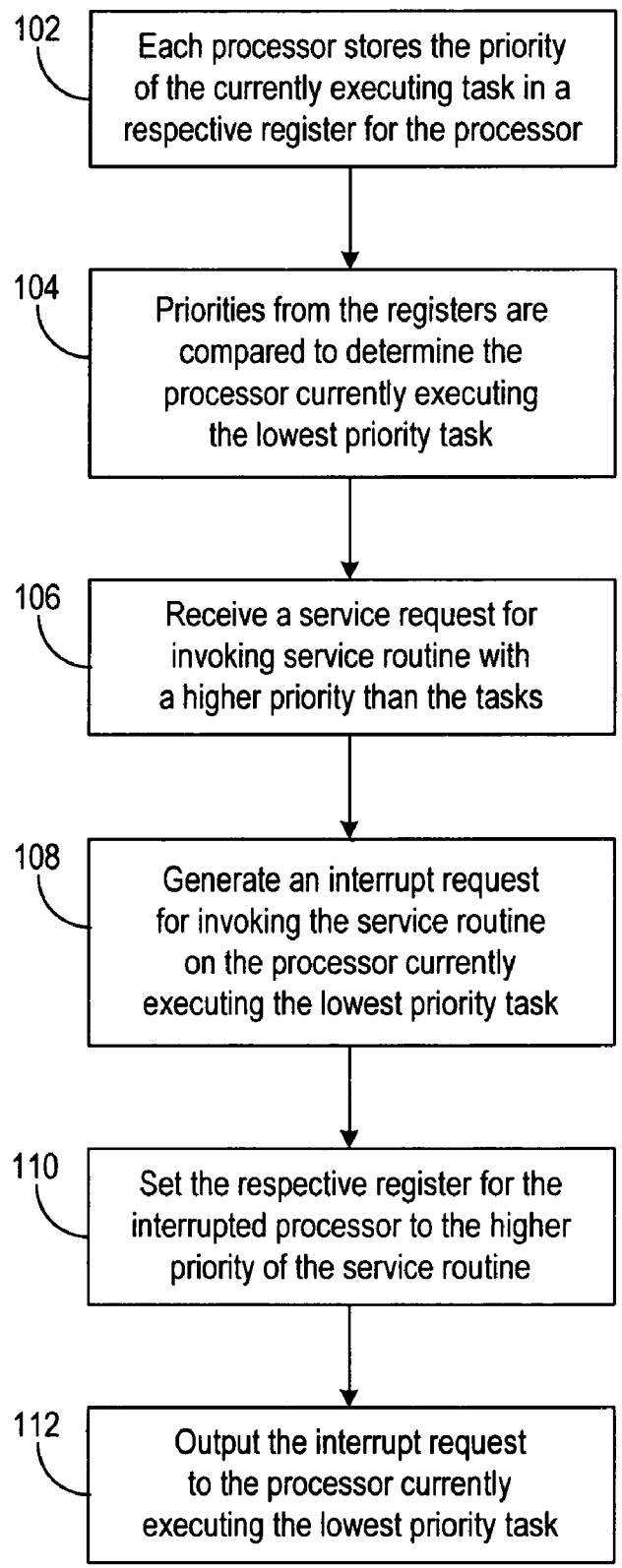
FIG. 1 is a flow diagram of a process for interrupting processors of a computing system in accordance with one or more embodiments of the invention.

FIG. 1 is a flow diagram of a process for interrupting processors of a computing system in accordance with one or more embodiments of the invention. An interrupt controller forwards each service request to the processor currently executing the lowest priority task.

At step 102, scheduling software selects a task for execution on a processor and stores the priority of the task in a priority register of the interrupt controller before beginning the execution of the task on the processor. Each processor has a corresponding priority register in the interrupt controller so the interrupt controller can determine the processor currently executing the lowest priority task at step 104.

At step 106, the interrupt controller receives a service request for invoking a service routine. Service routines frequently have a higher priority than any task. At step 108, the interrupt controller generates an interrupt request for invoking the service routine on the processor currently executing the lowest priority task as determined at step 104.

At step 110, the computing system sets the priority of the service routine in the priority register for the processor that is currently executing the lowest priority task as determined at step 104. In one embodiment, the interrupt controller automatically sets the priority register of this processor to a highest priority level indicating the processor is going to execute an interrupt service routine, and all interrupt service routines have this highest priority level. Having the interrupt controller set the priority register to a highest priority level prevents the next service request from immediately interrupting the same processor. In another embodiment, the interrupt controller first sets the priority register of this processor to a highest priority level, and the invoked service routine later sets the priority register to the actual priority level of the service routine. Thus, the interrupt controller can interrupt the processor executing the lowest priority service routine when no processor is executing a task at a lower priority because all processors are already executing service routines.

On completion of the service routine, the scheduler selects a task for execution and sets the priority register for the processor to the priority of the selected task, as in step 102. A task interrupted by a service routine can resume execution if the scheduler selects this task on completion of the service routine. It will be appreciated that the interrupt service routine could complete after creating one or more tasks for handling the service request.

At step 112, the interrupt request is output to the processor currently executing the lowest priority task, as determined at step 104. The interrupt request causes this processor to begin execution of the appropriate service routine. Thus, the service routine for each service request could execute on any processor, depending on which processor is currently executing the lowest priority task.

The hardware of the interrupt controller efficiently manages service requests and tasks in cooperation with the scheduling software. The software overhead is low for writing the priority level of each task to the appropriate priority register upon invocation of the task. The computing system is generally executing the available tasks and service routines with the higher priorities, because the interrupt controller directs each service request to the processor currently executing at the lowest priority. A computing system can readily implement this priority scheme using processors that do not directly support multiple priority levels, such as processors that implement only one interrupt level.

Figure 2:
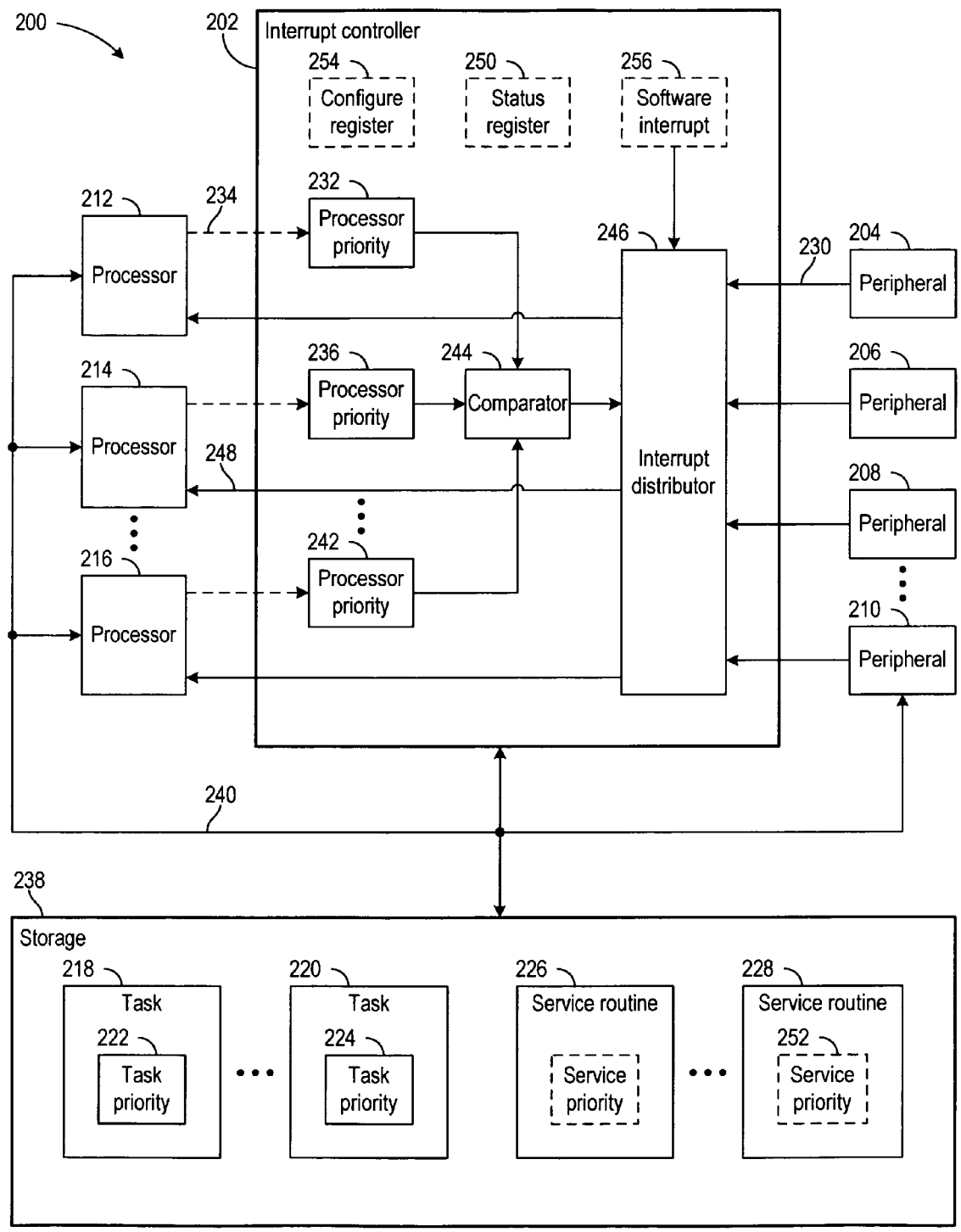
FIG. 2 is a block diagram illustrating an interrupt controller in accordance with various embodiments of the invention.

FIG. 2 is a block diagram illustrating an interrupt controller 202, in accordance with various embodiments of the invention. The interrupt controller 202 distributes each service request from peripherals 204 through 210 to processors 212, 214, and 216.

Processors 212 through 216 execute tasks 218 through 220. Frequently, any processor 212 through 216 could execute each of tasks 218 through 220, although a specific task, such as task 220, might execute only on a specific processor, such as processor 216. Task 218 has an associated task priority 222 and task 220 similarly has an associated task priority 224. In one embodiment, the computing system 200 assigns task priority 222 upon creating task 218.

Peripherals 204 through 210 can make a service request for invoking respective service routines 226 through 228. For example, peripheral 204 makes a service request for invoking service routine 226 by asserting the input on line 230 of the interrupt controller 202. One of processors 212 through 216 handles the service request by executing the service routine 226. Any one of processors 212 through 216 might handle each service request.

When, for example, processor 212 begins executing task 220, processor 212 writes the priority register 232 with the priority 224 of task 220, as indicated by dotted line 234. Similarly, if processor 214 begins executing tasking task 218, then processor 214 writes the priority register 236 with the priority 222 of task 218. It will be appreciated that interrupt controller 202, processors 212 through 216, peripherals 204 through 210, and storage 238 are interconnected by a system bus on line 240 in one embodiment. In this embodiment, processor 212 writes a priority to register 232 via system bus 240. Similarly, processor 214 writes priority register 236 and processor 216 writes priority register 242 via system bus 240.

The comparator 244 of interrupt controller 202 compares the values of priority registers 232, 236, and 242. The comparator 244 provides to distributor 246 an identifier of the priority register 232, 236, or 242 having the lowest value. If multiple priority registers 232, 236, and 242 have the lowest value, the comparator 244 selects one of the priority register 232, 236, or 242 having the lowest value. In one embodiment, the selection is arbitrary among multiple registers having the lowest priority level. It will be appreciated that tasks 218 through 220 could have distinct priorities 222 through 224, such that it is unexpected to have the same value in multiple priority registers 232, 236, and 242. In addition, the priorities 222 through 224 are integer values in one embodiment with higher integer values being higher priorities. Alternatively, lower integer values may signify higher priorities.

When interrupt distributor 246 receives a service request from one of peripherals 204 through 210, distributor 246 forwards the service request as an interrupt request to the processor having the lowest associated priority in registers 232, 236, and 242. For example, if peripheral 204 makes a service request on line 230 and priority register 236 has a lower value than priority registers 232 or 242, then distributor 246 transmits an interrupt request to processor 214 via the output on line 248 of the interrupt controller 202. The interrupt controller 202 immediately sets priority register 236 to a highest priority level to prevent forwarding the next service request to the same processor. Processor 214 responds to the interrupt request from line 248 by executing the service routine 226 corresponding to the service request of peripheral 204.

In one embodiment, a processor initially responds to an interrupt request by reading the optional status register 250. Optional status register 250 identifies the peripheral, such as peripheral 204, that caused the interrupt request of the processor. Thus, optional status register 250 identifies the service routine for handling the interrupt request.

For example, when peripheral 210 makes a service request that is forwarded to processor 216 because register 242 has a lower value than registers 232 and 236, optional status register 250 identifies peripheral 210 as causing the interrupt request of processor 216. Processor 216 can respond to the interrupt request by reading optional status register 250 and then executing service routine 228 corresponding to the service request from peripheral 210. The execution of service routine 228 can optionally include writing the service priority 252 to priority register 242 to enable interruption of the service routine by another service request. During execution of service routine 228, processor 216 can access peripheral 210 via system bus 240 to handle the service request. Upon completing execution of the service routine 228, processor 216 clears the indication in status register 250 of the service request from peripheral 210. In addition, processor 216 selects one of tasks 218 or 220 to execute next, and writes the corresponding task priority 222 or 224 to the priority register 242. Processor 216 is then selected to process another service request as soon as priority register 242 has a lower value than priority registers 232 or 236.

In another embodiment, priority registers 232, 236, and 242 provide the function of status register 250. Each service request from peripherals 204 through 210 has a unique identifier that could be a priority of the service request. Upon forwarding a service request as an interrupt request to the processor with the lowest priority in registers 232, 236, and 242, the priority register for that processor is set to the unique identifier of the service request. For example, distributor 246 forwards a service request from peripheral 206 to processor 214 when register 236 has a lower value than registers 232 and 242. Upon sending the interrupt request to processor 214, interrupt controller 202 sets register 236 to the unique identifier of the service request from peripheral 206. Processor 214 responds to the interrupt request by reading priority register 236, and the unique identifier from priority register 236 is an interrupt vector that identifies the service request as coming from peripheral 206. This determines the appropriate one of service routines 226 through 228 for processor 214 to execute.

In one embodiment, each interrupt request output, such as the output on line 248 from interrupt controller 202 to processor 214, includes multiple signals corresponding to the service requests from peripherals 204, 206, 208, and 210. Thus, no interrupt vector is needed, because the peripheral making a service request is identified by the signal transmitting the interrupt request. The interrupt controller 202 distributes each service request to the appropriate signal of the interrupt request output for the processor currently executing the lowest priority task. For example, when peripheral 204 asserts a service request on line 230 and the priority in register 236 is lower than the priorities in registers 232 and 242, then distributor 246 transmits a corresponding interrupt request to processor 214 on the signal of line 248 corresponding to peripheral 204.

In one embodiment, when multiple peripherals 204, 206, 208, and 210 simultaneously make a service request, interrupt distributor 246 can forward one service request as an interrupt request during each cycle of a clock signal for interrupt controller 202. In another embodiment, comparator 244 identifies multiple priority registers 232, 236, and 242 having the lower priorities, and each clock cycle interrupt distributor 246 can forward multiple service requests to the processors with the lower priorities.

Register 254 configures the operation of interrupt controller 202. Configuration register 254 selects between level and edge triggered service requests and interrupt requests. For example, the service request on line 230 from peripheral 204 is configurable to be a high level, a low level, a rising edge, and/or a failing edge. Similarly, the interrupt request on line 234 for processor 212 is configurable to output a high level, a low level, a rising edge, and/or a failing edge.

In one embodiment of the invention, the interrupt controller 202 includes a software interrupt generator 256. Processors 212 through 216 can access the software interrupt generator 256 to generate an interrupt request for one of processors 212 through 216 that is currently executing a lower priority task. For example, a scheduler could schedule a task to begin execution on the processor 212 through 216 that is currently executing the lowest priority task. This processor may respond by reading status register 250 and/or a register in software interrupt generator 256 to determine which service routine should execute to handle the software-generated interrupt for executing the scheduled task. It will be appreciated that this processor or another processor could be executing the scheduler. Thus, the scheduler can interrupt itself or a lower priority task executing on another processor.

In another embodiment, the interrupt controller includes a software interrupt generator 256, and processors 212 through 216 can write a priority value into software interrupt generator 256. Interrupt distributor 246 generates a corresponding interrupt request for the processor 212 through 216 having the lowest priority when this lowest priority from comparator 244 is lower than the priority value written into software interrupt generator 256. For example, a scheduler can write the priority 222 of task 218 to software interrupt generator 256 and the interrupt controller 202 generates an interrupt request for the processor 212, 214, or 216 currently executing the lowest priority task if task 218 has a higher priority 222. If the interrupt controller 202 generates such an interrupt request, the interrupted processor could respond to the interrupt request by executing task 218. Thus, a software generated interrupt could begin execution of a selected task when the selected task has a higher priority than the lowest priority task currently executing on processors 212 through 216.

The present invention is thought to be applicable to a variety of systems for processing interrupt requests. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. An interrupt controller for a computing system including a plurality of processors, comprising:
   a plurality of inputs, each for receiving a respective service request for invoking one of a plurality of service routines, each service routine having a higher priority than a plurality of priorities for executing a plurality of tasks on the processors;
   a plurality of registers respectively associated with the processors and each register for storing the priority of the task executing on the associated processor;
   a comparator coupled to the registers for determining a determined one of the processors executing a task having a lower priority among the priorities of the tasks executing on the processors;
   a distributor coupled to the inputs and the comparator, the distributor, in response to receiving the respective service request from each input, for generating an interrupt request for invoking the one of the service routines on the determined one of the processors, wherein the register associated with the determined one of the processors is set to the higher priority of the service routine in response to the interrupt request;
   a plurality of outputs, each output coupled to the distributor for transmitting the interrupt request to a respective one of the processors; and
   a software-interrupt generator coupled to an input of the distributor and writable by the processors with a software priority, the software-interrupt generator for generating an interrupt request that is transmitted by the distributor via the output for the determined one of the processors in response to one of the plurality of processors writing to the software-interrupt generator the software priority that is higher than the lower priority of the task executing on the determined one of the processors.

2. The interrupt controller of claim 1, wherein the register associated with each processor is writable by the processor for storing the priority of the task executed by the processor.

3. The interrupt controller of claim 1, further comprising a status register readable by the processors for identifying the respective service request causing the interrupt request.

4. The interrupt controller of claim 1, wherein the register associated with each processor is writable by the processor for restoring the priority of the task executed by the processor upon completing the service routine invoked on the processor by the interrupt request.

5. The interrupt controller of claim 1, wherein the plurality of priorities is a range of values with the lowest one of the plurality of priorities being a lowest one of the values and the highest one of the plurality of priorities being a highest one of the values.

6. The interrupt controller of claim 1, wherein the plurality of priorities is a range of values with the lowest one of the plurality of priorities being a highest one of the values and the highest one of the plurality of priorities being a lowest one of the values.

7. The interrupt controller of claim 1, wherein the priority of every service routine is equal and higher than the priorities of the tasks.

8. The interrupt controller of claim 1, wherein the priorities of the service routines are different from one another and higher than the priorities of the tasks.

9. The interrupt controller of claim 1, wherein the lower priority among the priorities of the tasks executing on the processors is a lowest priority among the priorities of the tasks executing on the processors.

10. The interrupt controller of claim 1, wherein the distributor is coupled to the registers for setting the register for the one of the processors to a highest priority in response to the generating of the interrupt request for invoking the one of the service routines on the one of the processors.

11. The interrupt controller of claim 1, wherein the register for each processor is writable by the processor for storing the higher priority of the one of the service routines in response to the interrupt request of the processor.

12. The interrupt controller of claim 1, wherein the distributor is coupled to the registers for setting the register for the one of the processors to the higher priority of the one of the service routines in response to the generating of the interrupt request, and the registers are readable by the processors for providing the higher priority to the one of the processors as an interrupt vector for identifying the one of the service routines invoked by the interrupt request.

13. The interrupt controller of claim 1, wherein each of the plurality of outputs of the interrupt controller includes a plurality of signals corresponding to the plurality of inputs, and the output transmits the interrupt request for invoking the one of the service routines via the one of the signals corresponding to the input receiving the respective service request.

14. The interrupt controller of claim 1, further comprising a configuration register coupled to each of the outputs for selecting one of a level and an edge for the transmitting of the interrupt request from the output to the processor for the output.

15. A method for interrupting a plurality of processors for executing a plurality of tasks with a plurality of priorities, comprising:
storing respective priorities of tasks executing on the processors in respective registers associated with the processors;
determining from the priorities stored in the registers, a determined one of the processors that is executing a task having the priority that is a lower priority among the priorities;
receiving a service request for invoking a service routine having a higher priority than the priorities of the tasks executing on the processors;
generating an interrupt request for invoking the service routine of the service request on the determined one of the processors in response to the service request;
setting the respective register associated with the determined one of the processors to the higher priority in response to the interrupt request;
outputting the interrupt request to the determined one of the processors;
storing a software priority of a first task from one of the processors in a software-interrupt generator; and
generating an interrupt request for invoking the first task on the determined one of the processors in response to the software priority being higher than the lower priority.

16. A computer system including a plurality of processors for executing a plurality of tasks with a plurality of priorities, comprising:
means for storing respective priorities of tasks executing on the processors in respective registers associated with the processors;
means for determining from the priorities stored in the registers, a determined one of the processors that is executing a task having the priority that is a lower priority among the priorities;
means for receiving a service request for invoking a service routine having a higher priority than the priorities of the tasks executing on the processors;
means for generating an interrupt request for invoking the service routine of the service request on the determined one of the processors in response to the service request;
means for setting the respective register associated with the determined one of the processors to the higher priority in response to the interrupt request; means for outputting the interrupt request to the determined one of the processors;
means for storing a software priority of a first task from one of the processors in a software-interrupt generator; and
means for generating an interrupt request for invoking the first task on the determined one of the processors in response to the software priority being higher than the lower priority.

* * * * *